US008325676B2

(12) United States Patent
Chen et al.

(10) Patent No.: US 8,325,676 B2
(45) Date of Patent: Dec. 4, 2012

(54) METHOD FOR NETWORK LAYER HANDOFF OVER A WIRELESS LAN AND AN ASSOCIATED ACCESS POINT DEVICE

(75) Inventors: Lin Chen, Beijing (CN); Zhiyong Liang, Beijing (CN); Yonghua Lin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 12/512,446

(22) Filed: Jul. 30, 2009

(65) Prior Publication Data

US 2010/0118831 A1 May 13, 2010

(30) Foreign Application Priority Data

Jul. 31, 2008 (CN) .......................... 2008 1 0129456

(51) Int. Cl.
*H04W 36/00* (2009.01)
*H04W 72/00* (2009.01)
(52) U.S. Cl. ................... 370/331; 370/338; 370/395.54; 455/436; 455/445; 709/245
(58) Field of Classification Search .................. 370/310, 370/328–329, 331, 338, 401, 395.4; 455/435.1, 455/436–445, 449, 517; 709/230, 245, 249–250
See application file for complete search history.

(56) References Cited

U.S. PATENT DOCUMENTS

| 7,016,682 | B2 | 3/2006 | Won et al. | |
|---|---|---|---|---|
| 2006/0212549 | A1* | 9/2006 | Hokkyo et al. | 709/220 |
| 2007/0081494 | A1* | 4/2007 | Petrescu et al. | 370/331 |
| 2011/0206008 | A1* | 8/2011 | Kim et al. | 370/331 |

FOREIGN PATENT DOCUMENTS

| CN | 200610169647 | * | 2/2008 |
|---|---|---|---|
| CN | 101212463 A | | 7/2008 |

OTHER PUBLICATIONS

Andrea G. Forte et al., "Improving Layer 3 Handoff Delay in IEEE 802.11 Wireless Networks", Proc. 2nd ann. int. workshop on Wireless Internet, vol. 220, Boston, MA, 2006.
Zeroshell, "Access Point Wireless with Multiple SSID and VLAN", http://wvvw.zeroshell.net/eng/wireless-access-point/ Jul. 16, 2009.

* cited by examiner

*Primary Examiner* — Habte Mered
(74) *Attorney, Agent, or Firm* — Cantor Colburn LLP; Gail Zarick (57) ABSTRACT

A method and a wireless access point device for a network layer handoff of a wireless mobile node over a wireless local area network. The method includes detecting a wireless mobile node that has moved into the coverage area of the wireless access point device; maintaining an available IP address pool; selecting a temporary IP address from the IP access pool in response to the detection of the mobile node moving into the coverage area; and assigning a temporary IP address to the mobile node for use by the node during an interim period. The method produces a network layer handoff of a wireless mobile node over a local area network. Also provided is a computer readable article of manufacture tangibly embodying computer readable instructions for executing the steps of the method.

14 Claims, 6 Drawing Sheets

METHOD FOR NETWORK LAYER HANDOFF OVER A WIRELESS LAN AND AN ASSOCIATED ACCESS POINT DEVICE

CROSS-REFERENCE TO RELATED APPLICATION

This application claims priority under 35 U.S.C. §119 from Chinese Patent Application No. 200810129456.2 filed on Jul. 31, 2008, the entire contents of which are incorporated herein by reference.

BACKGROUND OF THE INVENTION

1. Field of the Invention

The present invention relates to a method for network layer handoff and more particularly to a method for network layer handoff over a wireless LAN.

2. Description of Related Art

Wireless local area network (WLAN), such as those which use the IEEE 802.11 protocol, have become increasingly popular and rapidly developing technology. When a user of WLAN moves from the coverage area of one access point (AP) to another, it is desirable that the network support rapid seamless handoff so that the user does not experience perceptible voice quality degradation. In many cases, especially in applications that use voice communication over a WLAN, an overlong period of time for network handoff often leads to obvious voice quality degradation or even the occurrence of "call-drop".

The handoff over a WLAN generally involves two layers, i.e., link layer handoff denoting authentication and re-association with a new AP when a mobile node moves between the areas covered by different APs, and network layer handoff, which happens when a mobile node moves from one subnet to another subnet. In the latter case, the mobile node must acquire a valid IP address via schemes such as Dynamic Host Configuration Protocol (DHCP) after movement to another subnet. In general, network layer handoff, conveniently accomplished in several seconds, consumes much more time than link layer handoff. The ITU recommendation, G.114, allows a maximum time of 150 ms to 200 ms one-way latency for voice communication. Therefore, network layer handoff has been too high in latency time to be used for voice communication over a WLAN.

Figure 1:
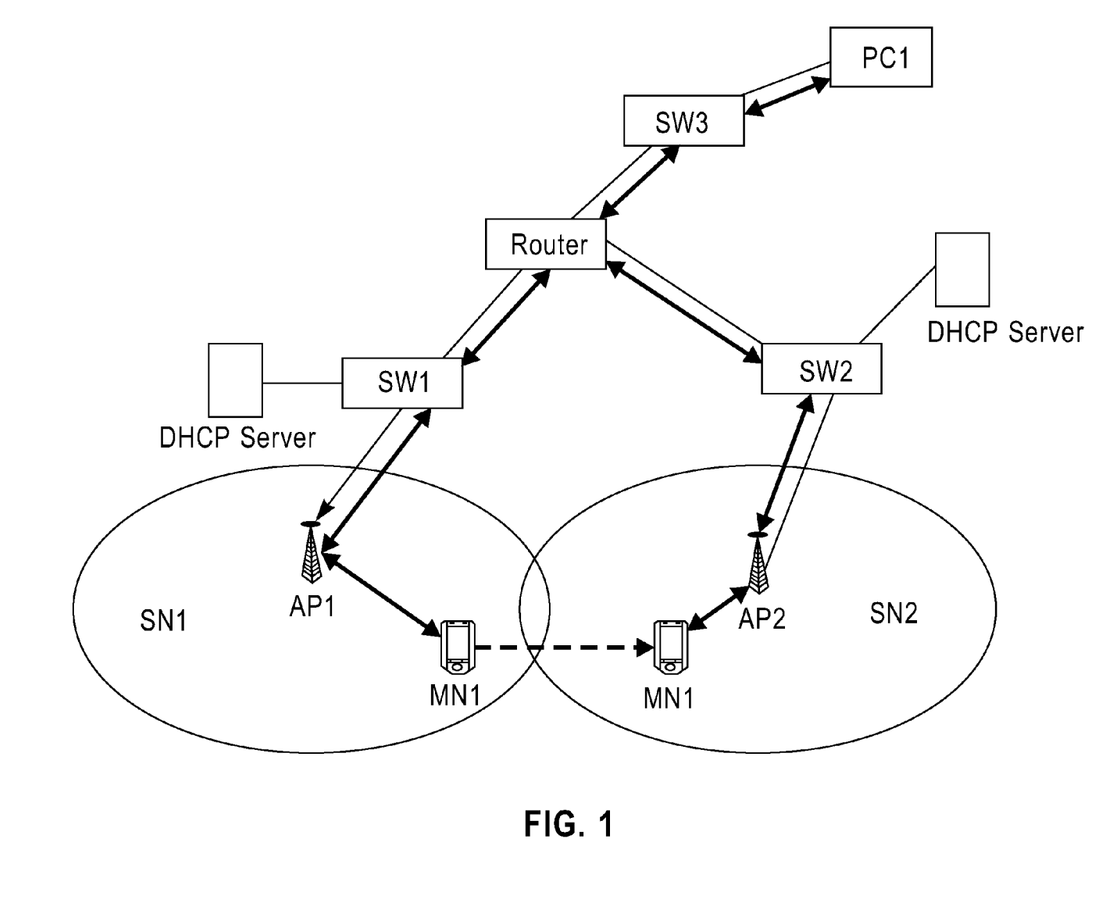
FIG. 1 is a schematic diagram of a network layer handoff over a WLAN.

FIG. 1 is a schematic diagram showing the network layer handoff achieved based on a DHCP scheme over WLAN. In this figure, two wireless local area networks SN1 and SN2 are covered by two wireless access points AP1 and AP2, respectively. SN1 and SN2 are located in two different subnets, each of which has a DHCP server used for IP address assignment. AP1 and AP2 connect to switches SW1 and SW2, respectively. A router is connected with switches SW1 and SW2, and a personal computer PC1 is connected to the router via another switch SW3.

A mobile node MN1 within the first WLAN subnet SN1 establishes bi-directional communication with PC1 via the path of AP1-SW1-router-SW3. When mobile node MN1 moves from WLAN SN1 to another WLAN subnet SN2, a network layer handoff will occur in which mobile node MN1 obtains a new valid IP address from the DHCP server of the second subnet. At this point, mobile node MN1 communicates with PC1 through a new path of AP2-SW2-router-SW3. However, due to the duplicate address detection process required by the DHCP server, multiple instances of message interaction are required in the IP address acquisition process. Hence, the acquisition of a new IP address from the DHCP server leads to an overlong latency, generally on the order of seconds. This is unacceptable for applications such as voice communication.

In an article by Andrea G. Forte, Sangho Shin, and Henning Schulzrinne, "Improving Layer 3 Handoff Delay in IEEE 802.11 Wireless Networks", published In Proceedings of the 2nd annual international workshop on wireless internet, Vol. 220, Boston, Mass., 2006, a method for reducing the latency of IP address acquisition via a DHCP server using a temporary IP address is introduced. In this article, a temporary IP address is acquired by a wireless mobile node at first for data transmission and, upon receipt of a formal IP address allocated from the DHCP server, the formal IP address is used for subsequent data transmission.

In this example, the acquisition of the temporary IP address is achieved by the sending of ten Address Resolution Protocol (ARP) requests by the wireless mobile node and testing ten successive IP addresses, e.g., the ten latest IP addresses used, to find possible IP addresses not in use. Such a test method is somewhat random and brings about an additional overhead of waiting during the timeout for the ARP response, more than about 100 ms, and thus cannot meet the strict latency requirement for voice transmission.

SUMMARY OF THE INVENTION

The present invention provides a method for realizing seamless handoff, and an associated wireless access point device for implementing the handoff method, which can greatly reduce the latency of network layer handoff over a WLAN, by means of improvement of the existing approach for acquisition of an IP address from a DHCP server.

According to an aspect of the present invention, there is provided a method for a network layer handoff of a wireless mobile node over a wireless local area network. The method includes detecting by a movement detecting module that a wireless mobile node has moved into the coverage area of the wireless access point device; maintaining an available IP address pool by the wireless access point device; selecting by a temporary IP assigning module a temporary IP address from the available IP access pool in response to the detection of the mobile node moving into the coverage area; and assigning by the temporary IP assigning module a temporary IP address from the available IP address pool to the wireless mobile node for use by the wireless mobile node during an interim period, thereby obtaining the result of a network layer handoff of a wireless mobile node over a wireless local area network by a wireless access point device.

According to yet another aspect, the present invention provides a wireless access point device for a network layer handoff of a wireless mobile node over a wireless local area network. The device includes: a movement detecting module for detecting the association of the wireless mobile node and the wireless access point; an available IP address pool; and a temporary IP address assigning module for selecting a temporary IP address from the available IP address pool, and assigning the temporary IP address to the mobile node.

According to still another aspect, the present invention provides a computer readable article of manufacture tangibly embodying computer readable instructions for executing a computer implemented method for a network layer handoff of a wireless mobile node over a wireless local area network.

Thus, the present invention achieves seamless network layer handoff by using a temporary IP address. However, in contrast to the approach proposed by Forte et al., the temporary IP address is not selected through multiple instances of tests carried out by the mobile node. Instead, an available IP address pool is maintained by the AP, and a temporary IP address is assigned by the AP to the mobile node for immediate use when a new IP address is needed. Random tests and additional waiting time for a response can be avoided, thus improving the handoff latency during IP address acquisition.

DETAILED DESCRIPTION OF THE PREFERRED EMBODIMENTS

FIG. 1 shows a schematic diagram illustrating voice communications between mobile node MN1 and personal computer PC1. However, in practice, it is also possible to conceive other scenarios in which communication is done between mobile nodes or between a mobile node and fixed voice equipment. In the case shown in FIG. 1, a mobile node MN1 carries out bi-directional communication with PC1 via access point AP1, a switch and a router. When MN1 moves from the coverage area of access point AP1 to that of another access point, AP2, a handoff to AP2 is necessary for ensuring a seamless connection Since AP1 and AP2 shown in FIG. 1 are located in different subnets, a network layer handoff occurs, where MN1 has to be assigned a new IP address from the DHCP server associated with AP2.

When mobile node MN1 enters another WLAN subnet SN2, the new subnet can detect its presence in the new subset by two methods. In the first the new subnet receives a broadcast message from AP2, and then determines the mobile nodes location within the new subnet based on the IP address of the broadcast message and its own the IP address. The second way, which is faster, involves active notification via the link layer of MN1, that is, actively notifying MN1 whether a network layer handoff is required when link layer handoff occurs.

The present invention differs from the prior art, according to an embodiment, in that, after MN1 leaves the coverage area of AP1 and before a new IP address is obtained from the DHCP server, AP2 assigns a temporary IP address directly to MN1 from an available IP address pool maintained that it maintains in order to carry out communications in the interim. When a formal IP address is obtained from the DHCP server, MN1 replaces the temporary IP address with the formal one to resume communication.

Figure 2:
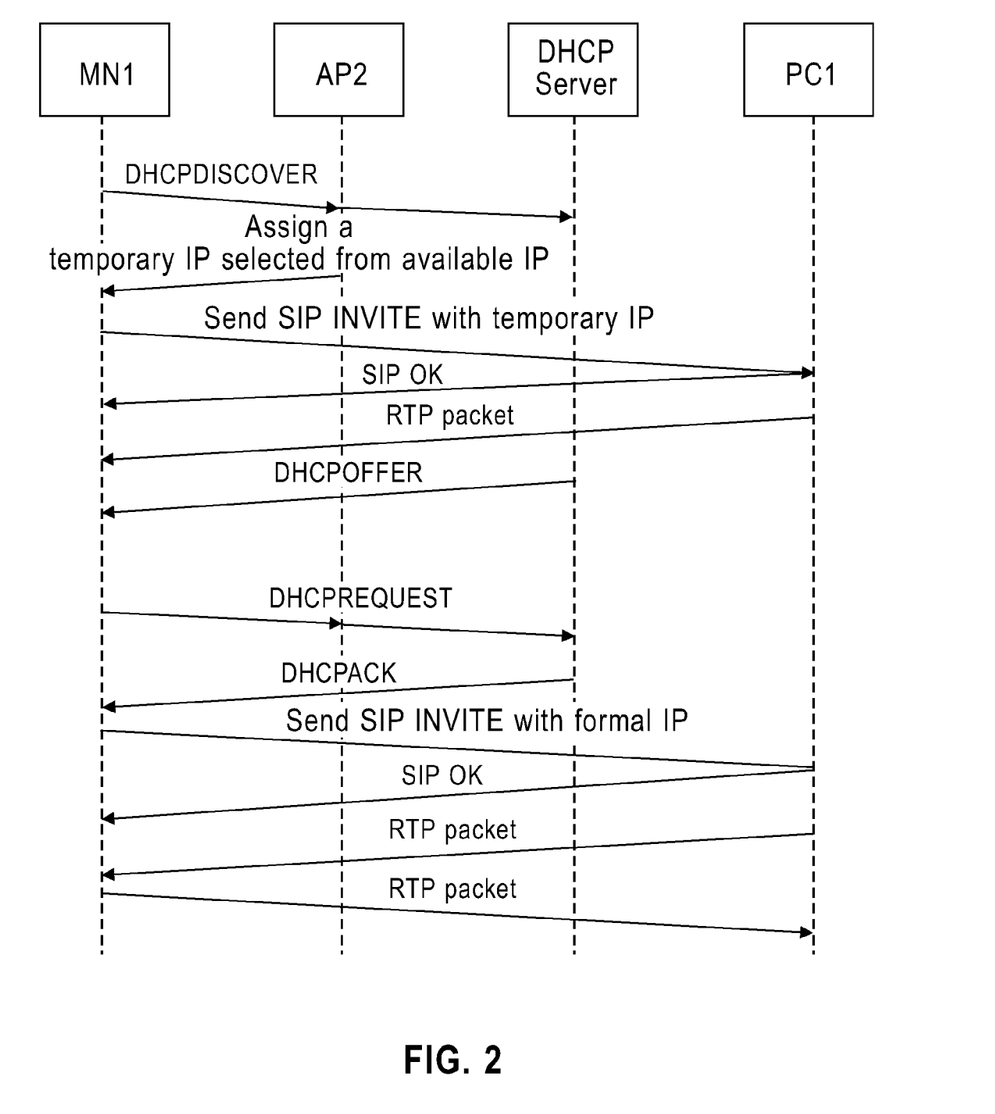
FIG. 2 is a timing diagram of the method for fast network layer handoff according to an embodiment of the present invention.

FIG. 2 is a timing diagram of the method for fast network layer handoff according to the present invention. At first, mobile node MN1 sends a DHCPDISCOVER (DHCP discovery) message to AP2 by a broadcast to indicate that it requires a new IP address. AP2 broadcasts the received DHCPDISCOVER message to the DHCP server, and assigns MN1 a temporary IP address selected from its own available IP address pool.

When receiving the temporary IP address, MN1 send SIP INVITE (SIP inviting) message to PC1 by using the temporary IP address, notifying of the change in IP address within the interim time period before getting a formal IP address. Then, PC1 can reply with SIP OK (SIP acknowledge) and update the SIP session, pertaining to an application layer protocol, correspondingly. Then, the temporary IP address can be used to resume real-time transmission of Real-time Transport Protocol (RTP) data packets between MN1 and PC1.

Next, as in a conventional DHCP scheme, the DHCP server finds an available formal IP address after the duplicate address detection is ended, and sends a DHCPOFFER packet to MN1. MN1 selects one specified IP address from the DHCPOFFER (DHCP offering) packets it receives, and broadcasts a DHCPREQUEST (DHCP request) packet to confirm the use of the formal IP address. The DHCP server may reply with DHCP ACK (DHCP acknowledgment). Then, MN1 sends again an SIP INVITE data packet with the formal IP address to PC1 to notify PC1 of the formal IP address. PC1 may reply with SIP OK and resume real-time bi-directional data transmission of RTP data packets.

The increased speed for the acquisition of a temporary IP address is owed largely to the available IP address pool maintained by the AP. Here the addresses in the available IP address pool can be categorized into two categories: (1) the given number of reserved addresses pre-fetched from the DHCP server by the AP when it is initialized, and (2) the unexpired idle IP addresses obtained by tracing the movement of mobile nodes and the recycling of idle IP address when the corresponding mobile node moves into another subnet. Below, is the description in detail for the mechanism for available IP address pool maintenance, idle IP address recycle, and negotiation between a mobile node and an AP with reference to FIGS. 3, 4, and 5.

Figure 3:
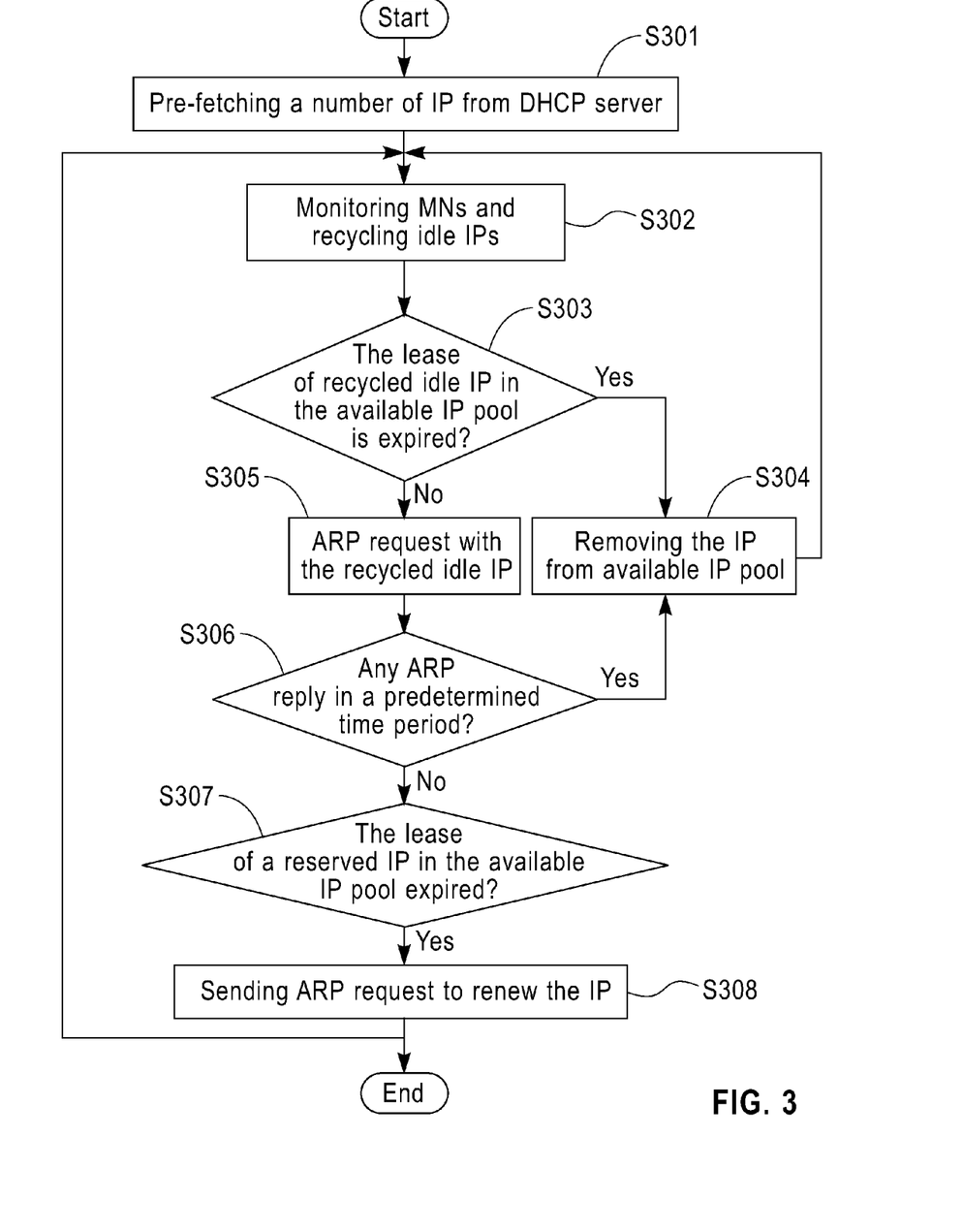
FIG. 3 is a flowchart of the method for maintaining the available IP address pool for an access point according to an embodiment of the present invention.

FIG. 3 is an exemplary flowchart showing the process of maintaining the available IP address pool by an AP according to the present invention. When the process is initiated at step S301, the AP fetches a number of IP addresses which are reserved for network layer handoff, e.g., one or two, from the associated DHCP server in advance and inserts these pre-fetched addresses into the available IP pool. In order to pre-fetch the reserved IP addresses from the DHCP server, the AP may simulate several, e.g., one or two, virtual MAC addresses, request IP addresses for the virtual MAC addresses following the IP address requesting process specified by DHCP protocol, and then put them into the available IP pool.

After the AP initialization, at step S302, the AP continuously monitors the movement of any associated mobile nodes within its coverage area. If one mobile node moves to other subnets, the AP recycles the unexpired IP address of this mobile node, and then the recycled IP can be assigned to another mobile node moving into the coverage area of this AP at a later appropriate time. This recycle process will be described in detail with reference to FIG. 4.

At step S303, the AP checks whether the lease of the recycled idle IP address is expired. If so, the expired idle IP address is removed from the available IP address pool, at step S304, and is not to be used any more. Otherwise, if the lease of the recycled idle IP address is not expired, the process proceeds to step S305. At step S305, the AP sends an address resolution protocol (ARP) request periodically with the recycled idle IP addresses to check if any collision exists with this IP address.

At step S306, it is determined whether there is any ARP reply received in a predetermined period, i.e., before the timeout of a timer. If no ARP reply for this IP is received within the predetermined period, this IP address is regarded as still available. Otherwise, this IP address is removed from the available IP address pool, step S304.

Next, at step S307, it is determined whether the lease of the reserved IP addresses in the available IP address pool is expired. If any of the reserved IP addresses is expired, the process proceeds to step S308, in which a DHCPREQUEST data packet, for example, is sent to the DHCP server to renew the lease of the expired IP address.

In this way, the AP merely needs to maintain a small IP address pool. In the case of infrequent network layer handoff, the pre-fetched IP address from the DHCP server, for example, one or several IP addresses, is sufficient so as to avoid occupying excessive resources. The IP addresses in the pool can be temporally used by mobile nodes before a formal IP address is obtained from the DHCP server. The communication with the temporary IP address only lasts a short duration, e.g., several hundred milliseconds to 1 to 2 seconds, to achieve the seamless handoff.

It will be understood that the steps shown in FIG. 3 and the execution order shown are illustrative, and those skilled in the art can modify or adjust the maintenance mechanism of the available IP address pool without departing from the scope of the present invention. For example, in checking the lease information on the IP addresses in the available IP address pool, it is also possible to check whether the lease of any of the reserved IP addresses is expired first, and then check the lease of the recycled idle IP addresses.

Figure 4:
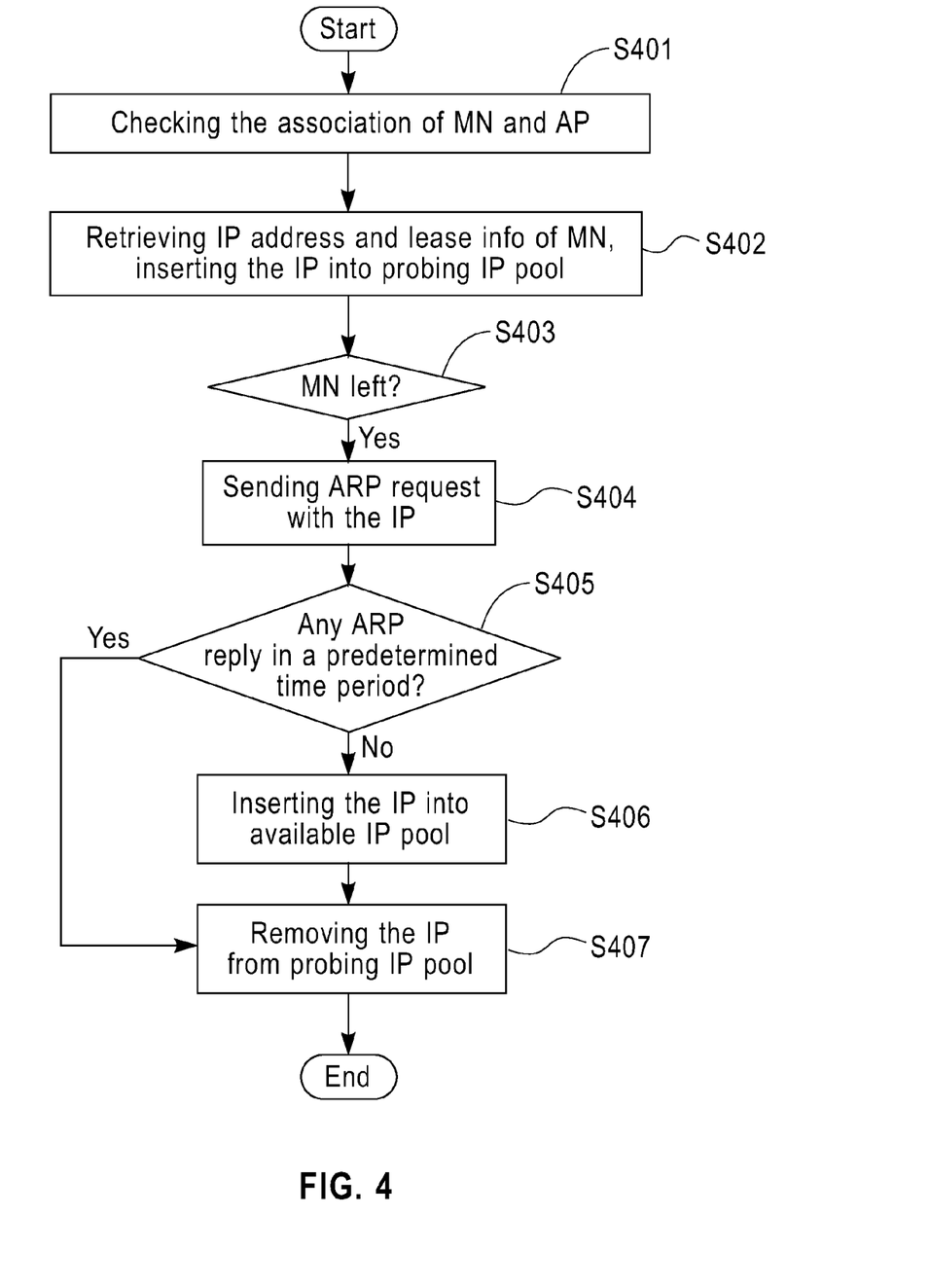
FIG. 4 is a flowchart of the method for tracing the movement of a mobile node and recycling idle IP addresses according to an embodiment of the present invention.

FIG. 4 is a flowchart showing in detail the steps of tracing the mobile nodes and recycling the idle IP addresses, step S302, shown in FIG. 3. In a WLAN, each mobile node is associated with only one AP, and the AP can utilize this information to monitor the movement of mobile nodes. For example, when a mobile node issues a request for association to an AP, the AP will detect that this mobile node is entering its own coverage area. On the other hand, if a mobile node no longer associates with this AP, the AP will detect that the mobile node has moved to another AP's coverage area or has gone to sleep. Therefore, according to this embodiment of the present invention, using such association information obtained from the mobile node, it is possible to recycle idle IP addresses of the mobile nodes leaving the coverage area of the AP, so as to expand the available IP address pool.

At first, at step S401, the AP continuously detects an associated mobile node. Then, at step S402, it retrieves the IP address and lease information, if applicable, of this mobile node, and inserts the current IP address of the mobile node in a probing IP address pool. Then, it continuously detects whether the mobile node has left its coverage area, step S403. If the mobile node has left, the process proceeds to step S404.

At step S404, by periodically sending ARP request with that IP address, the availability of the IP address is detected. And then, at step S405, it is determined whether any ARP reply is received in a predetermined time period. If so, the indication is that the mobile node has moved into the coverage area of another AP within the same subnet, and this IP is to be removed from the probing IP address pool, step S406, and is no longer to be probed. Otherwise, if no ARP reply is received within the predetermined time, the indication is that the mobile node has moved to another subnet or has gone to sleep, and this IP address can be recycled for subsequent use in this subnet. Consequently, this IP address is inserted into the available address pool, and is removed from the probing IP address pool. With this optional process, the available IP address pool can be expanded.

Figure 5:
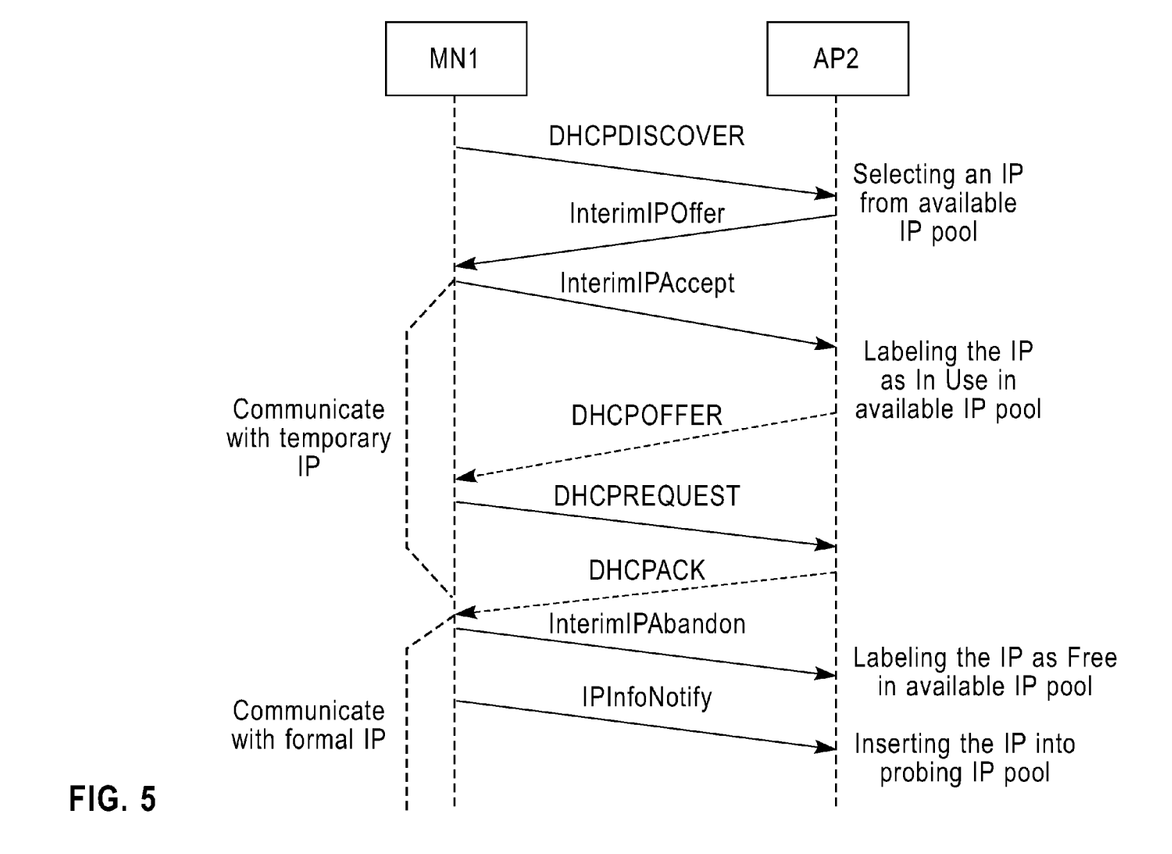
FIG. 5 is a flowchart of the method of negotiation between the mobile node and the AP according to an embodiment of the present invention.

According to an optional embodiment of the present invention, as shown in the timing diagram of FIG. 5, a negotiation mechanism between the mobile node and the AP is demonstrated.

As shown in FIG. 5, at first when a network layer handoff occurs, mobile node MN1 broadcasts a DHCPDISCOVER message to AP2, notifying that it needs a new IP address. When AP2 receives the DHCPDISCOVER broadcast from mobile node MN1, it selects a temporary IP from its own available IP address pool, and sends it to MN1 by means of an InterimIPOffer packet. MN1 immediately sends back an InterimIPAccept packet to AP2 as an acknowledgement.

When AP2 receives the InterimIPAccept packet, it labels this temporary IP as "In Use", to prevent this IP from being assigned to other mobile nodes. Meanwhile, as shown in FIG. 2, MN1 uses this temporary IP to update the SIP session and the real time data transmission with PC1.

When MN! receives the DHCPOFFER message from the DHCP server, it chooses a formal IP address, sends a DHCPREQUEST packet, and then waits for the DHCPACK in the same manner as shown in FIG. 2. It is noted that AP2 simply forwards the packet, and, therefore, this is denoted by the dotted line in FIG. 5.

After MN1 receives the DHCPACK packet, it renews the SIP session and real-time data transmission with this formal IP address as shown in FIG. 2. Meanwhile, MN1 sends an InterimIPAbandon packet to AP2 to notify AP2 that this temporary IP address is no longer to be used. Also an IPInfoNotify packet is sent to AP2 to notify AP2 of the new IP address and lease information.

After receiving the notification from MN1, AP2 correspondingly labels this temporary IP address as free, and insert the new formal IP address of MN1 into the probing address pool, so as to continuously trace the movement of this mobile node.

The advantage of this negotiation process lies in the fact that the AP and mobile node with the capability of fast handoff can be fully compatible with conventional AP and client software. When any side does not support such enhanced capability, the acquisition of an IP address will return to the standard DHCP process. Of course, the negotiation shown in FIG. 5 is an option, and in practice, the AP may also acquire address information about the mobile node actively without any associated notification sent from the mobile node.

Optionally, in order to assign a temporary IP address, the AP may select an available IP address following the below principles. First, the reserved IP addresses in the available IP address pool are checked. If one of the reserved IP addresses is free, this reserved IP can be assigned to the mobile node. If all the reserved IP addresses have been assigned to other mobile nodes, then the recycled IP addresses are checked, and one with the longest remaining lease is selected to assign the temporary IP address.

Figure 6:
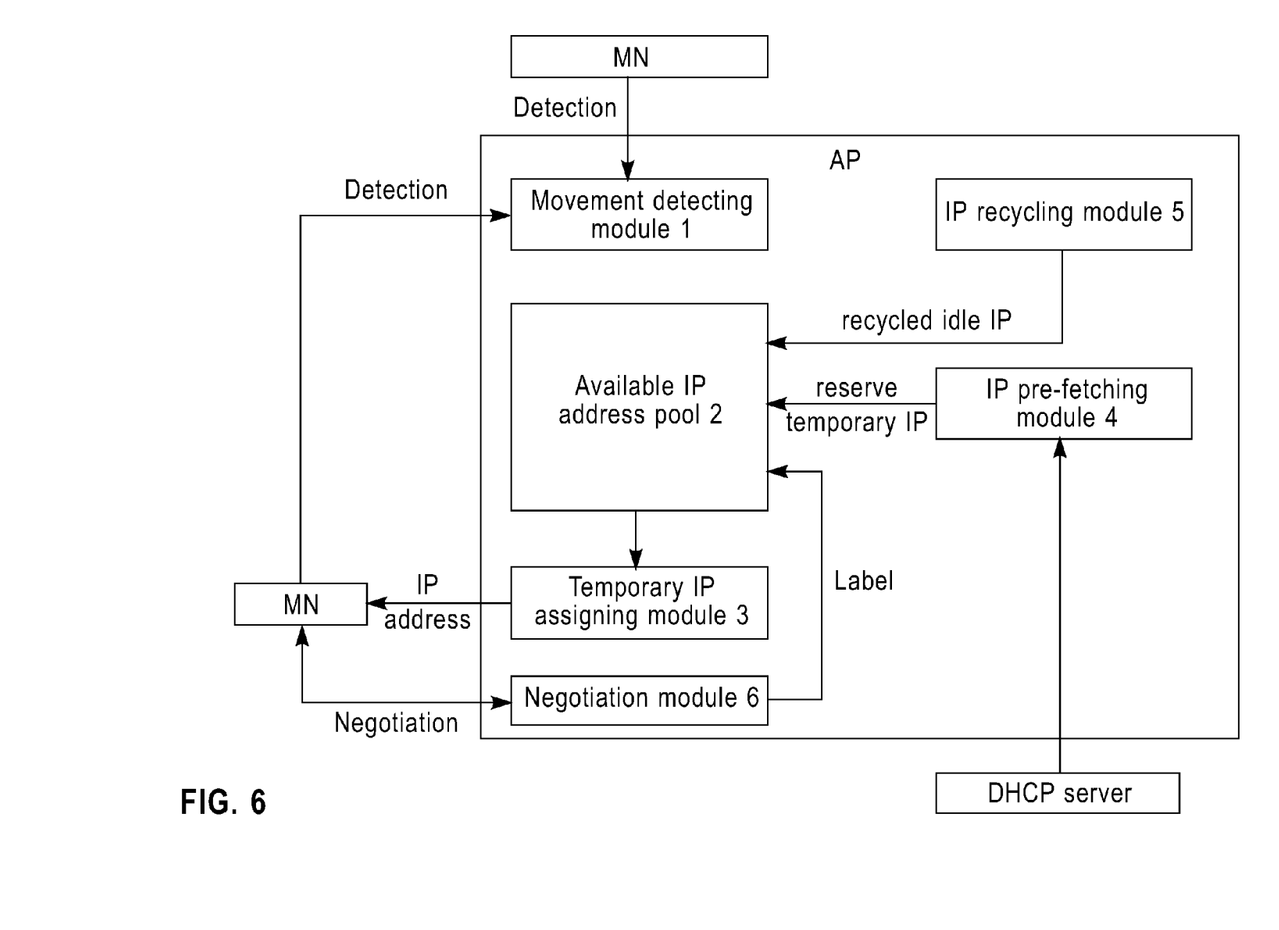
FIG. 6 is a block diagram showing the wireless access point device according to an embodiment of the present invention.

FIG. 6 is a block diagram of a wireless access point device according to an embodiment of the present invention. The wireless access point device, AP, includes a movement detecting module 1 for detecting the association between the mobile node MN and the wireless access point device AP; an available IP address pool 2; and a temporary IP address assigning module 3 for selecting a temporary IP address from the available IP address pool 2 and assigning it to the mobile node. Here, the movement detecting module 1 can detect whether a mobile node has moved into the coverage area of the wireless access point device AP from another subnet. Further, it can also determine whether a mobile node associated with the wireless access point device AP has left the subnet of the AP.

As shown in FIG. 6, wireless access point device AP further includes an IP address reservation or pre-fetching module 4 for reserving or pre-fetching a given number of IP addresses as reserved IP addresses from a DHCP server and inserting them into the available IP address pool; IP address recycling module 5 for recycling the IP addresses of the mobile nodes detected by the movement detecting module 1, that is, the IP addresses whose owners have left the subnet of the AP, and inserting the IP addresses into the available IP address pool as idle IP addresses. Both the IP address reservation module 4 and the IP address recycling module 5 are further used to maintain the available IP address pool 2 by means of the process described above to insert the available IP addresses into the available IP address pool 2. Optionally, the wireless access point device AP further includes a negotiation module 6 for negotiating with the mobile node in the above manner, to label the IP addresses in available IP address pool 2 as in-use or free.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for a network layer handoff of a wireless mobile node over a wireless local area network by a wireless access point device, comprising:
    detecting by a movement detecting module that the wireless mobile node has moved into the coverage area of the wireless access point device;
    maintaining an available IP address pool by the wireless access point device, said maintaining comprising:
        pre-fetching by a pre-fetching module a given number of IP addresses from a Dynamic Host Configuration Protocol (DHCP) server;
        inserting the pre-fetched IP addresses by the pre-fetching module into the available IP address pool as reserved IP addresses;
        checking by the wireless access point a lease expiration of at least one reserved IP address in the available IP address pool; and
        sending a request to the DHCP server to renew the lease upon the expiration of the lease;
    selecting by a temporary IP assigning module a temporary IP address from the available IP access pool in response to the detection of the mobile node moving into the coverage area; and
    assigning by the temporary IP assigning module a temporary IP address from the available IP address pool to the wireless mobile node for use by the wireless mobile node during an interim period, thereby obtaining the result of a network layer handoff of a wireless mobile node over a wireless local area network by a wireless access point device.

2. The method according to claim 1, further comprising:
    obtaining by the wireless access point device a formal IP address for the mobile node; and
    replacing the temporary IP address with the formal IP address.

3. The method according to claim 1, further comprising:
    monitoring by the movement detecting module the movement of an associated mobile node within the coverage area of the wireless access point device;
    recycling by an IP recycling module the IP address of the associated mobile node when the associated mobile node has left the subnet of the wireless access point; and
    inserting by the IP recycling module the IP address of the mobile node as an idle IP address into the available IP address pool.

4. The method according to claim 3, further comprising:
    checking by the wireless access point the lease expiration of at least one of the idle IP addresses in the available IP address pool; and
    removing the at least one idle IP address from the available IP address pool upon the expiration of the lease of the IP address.

5. The method according to claim 3, further comprising:
    checking by the wireless access point device the lease expirations of the idle IP addresses; and
    assigning the idle IP address with the longest remaining lease to the mobile node as the temporary IP address.

6. The method according to claim 1, further comprising:
    receiving notification by a negotiation module from the mobile node moving into the coverage area that the mobile node has received the temporary IP address assigned by the wireless access point;
    labeling by the negotiation module the temporary IP address as in-use in the available IP address pool; and
    in response to receiving notification from the mobile node that the mobile node has obtained a formal IP address, labeling by the negotiation module the temporary IP address previously used by the mobile node as free in the available IP address pool for the subsequent use by another mobile node.

7. The method according to claim 1, further comprising:
    checking by the wireless access point device the status of the reserved IP addresses in the available IP address pool; and
    in response to detecting that the status of a reserved IP address is free, assigning the IP address to the mobile node as the temporary IP address.

8. A wireless access point device for a network layer handoff of a wireless mobile node over a wireless local area network, comprising:
    a movement detecting module for detecting an association of the wireless mobile node and the wireless access point;
    an a memory storing available IP address pool maintained by the wireless access point device;
    a temporary IP address assigning module for selecting a temporary IP address from the available IP address pool and assigning the temporary IP address to the mobile node; and
    an IP pre-fetching module for pre-fetching a given number of IP addresses from a DHCP server and for inserting the IP addresses into the available IP address pool as reserved IP addresses, wherein the wireless access point device checks the lease expirations of the reserved IP addresses in the available IP address pool; and in response to the expiration of a lease, sends a request to a DHCP server to renew the lease.

9. The device according to claim 8, further comprising:
    an IP recycling module for recycling the IP address of the mobile node and inserting the address into the available IP address pool as an idle IP address when the movement detecting module detects that the mobile node has moved out of the subnet of the wireless access point device.

10. The wireless access point device according to claim 9, wherein:
the wireless access point device checks the lease expirations of the idle IP addresses in the available IP address pool; and
in response to the expiration of the lease of an idle IP address, removes the idle IP address from the available IP address pool.

11. The wireless access point device according to claim 8, further comprising:
a negotiation module for receiving a notification from the mobile node moving from another subnet into the coverage area of the wireless access point device, and labeling an IP address as in-use or free in the available IP address pool based on the notification from the mobile node.

12. The wireless access point device according to claim 8, wherein the wireless access point device checks the status of the IP addresses in the available IP address pool and in response to the detection of an idle IP address, assigns the idle IP address to the mobile node as a temporary IP address.

13. The wireless access point device according to claim 8, wherein the wireless access point device checks the lease expirations of the IP addresses in the available IP pool, and selects the address with the longest remaining lease as the temporary IP address to be assigned to the mobile node.

14. A computer readable article of manufacture tangibly embodying computer readable instructions for executing a computer implemented method for a network layer handoff of a wireless mobile node over a wireless local area network by a wireless access point device, the method comprising:
detecting by a movement detecting module that a wireless mobile node has moved into the coverage area of the wireless access point device;
maintaining an available IP address pool by the wireless access point device, said maintaining comprising:
pre-fetching by a pre-fetching module a given number of IP addresses from a Dynamic Host Configuration Protocol (DHCP) server;
inserting the pre-fetched IP addresses by the pre-fetching module into the available IP address pool as reserved IP addresses;
checking by the wireless access point a lease expiration of at least one reserved IP address in the available IP address pool; and
sending a request to the DHCP server to renew the lease upon the expiration of the lease;
selecting by a temporary IP assigning module a temporary IP address from the available IP access pool in response to the detection of the mobile node moving into the coverage area; and
assigning by the temporary IP assigning module a temporary IP address from the available IP address pool to the wireless mobile node for use by the wireless mobile node during an interim period, thereby obtaining a network layer handoff of a wireless mobile node over a wireless local area network by a wireless access point device.

* * * * *